(12) United States Patent
Helf

(10) Patent No.: US 6,248,396 B1
(45) Date of Patent: *Jun. 19, 2001

(54) ASPHALT COMPOSITIONS

(76) Inventor: Gary Helf, 7720 Mayfield Rd., Gates Mills, OH (US) 44040

( * ) Notice: Subject to any disclaimer, the term of this patent is extended or adjusted under 35 U.S.C. 154(b) by 0 days.

This patent is subject to a terminal disclaimer.

(21) Appl. No.: 09/255,174

(22) Filed: Feb. 22, 1999

(51) Int. Cl.⁷ .................... E01L 5/12; C08L 95/00
(52) U.S. Cl. ............ 427/138; 427/136; 524/59; 524/60; 524/62
(58) Field of Search .................... 427/136, 137, 427/138, 139

(56) References Cited

U.S. PATENT DOCUMENTS

| | | | |
|---|---|---|---|
| 3,919,148 | 11/1975 | Winters et al. | 524/62 |
| 4,166,049 | 8/1979 | Huff | 524/62 |
| 4,217,259 | 8/1980 | Bresson | 524/68 |
| 4,412,019 | 10/1983 | Kraus | 524/68 |
| 4,835,199 | 5/1989 | Futamura et al. | 524/68 |
| 4,973,615 | 11/1990 | Futamura et al. | 524/68 |
| 5,710,196 | 1/1998 | Willard | 524/68 |

OTHER PUBLICATIONS

Brzozowski, Kenneth, "Asphalt vs. Coal Tar", Jul. 1990, pp. 26–37.

*Primary Examiner*—Peter Szekely
(74) *Attorney, Agent, or Firm*—Renner, Otto, Boiselle & Sklar LLP

(57) ABSTRACT

In one embodiment, the present invention relates to an asphalt composition containing asphalt, a terpenoid liquid, a rubber at least partially soluble in the asphalt composition and a flexible aggregate.

12 Claims, No Drawings

ASPHALT COMPOSITIONS

TECHNICAL FIELD

The present invention generally relates to asphalt compositions. In particular, the present invention relates to asphalt compositions useful for paving surfaces, methods of paving surfaces using the asphalt compositions, asphalt compositions useful as a stress absorbing layer between old and new pavement surfaces, and asphalt pavement having a surface that flexes.

BACKGROUND OF THE INVENTION

Road pavements are made with maximum strength. Consequently, aggregate incorporated into road pavements is hard aggregate. Asphalt is no exception. Hard aggregate used in asphalt includes sand, rocks, pebbles, gravel, glass and stone. While hard aggregate increases the maximum strength of asphalt, hard aggregate also increases sturdiness or inflexibility of asphalt. A pavement characterized by sturdiness and inflexibility is not desirable in all instances. Therefore, new asphalt pavements are desired.

A new asphalt surface is in some instances conventionally applied to an old asphalt surface in need of resurfacing. Typically, this is because the old asphalt surface exhibits cracks. This phenomenon is sometimes termed reflective cracking. One reason for this phenomenon is that asphalt is a relatively brittle material, and over time, various stresses imposed on an asphalt surface induce the formation of cracks. Accordingly, old asphalt surfaces are simply repaved with a new asphalt layer. However, the new asphalt layer tends to exhibit cracks, often in the same places where the old, underlying asphalt layer exhibited cracks.

In an attempt to solve this problem, a membrane is used between the old and new layers of asphalt. There are two types of conventional membranes; namely, a layer of a liquid binder embedded with a hard aggregate material (shot and chip) and a fabric layer. Conventional membranes function by exerting tension on the old, underlying asphalt layer so as to prevent the old, underlying asphalt layer from moving (exerting force). New asphalt surfaces applied over a convention membrane which is turn applied over an old asphalt surface continue to exhibit cracking. New and improved methods of repaving cracked asphalt surfaces and/or new and improved materials for repaving cracked asphalt surfaces are desired.

SUMMARY OF THE INVENTION

The present invention provides asphalt compositions which minimize the use of undesirable organic solvents. The present invention also provides asphalt compositions which are strong and durable yet flexible. As a result, the dangers associated with ice formation on pavements made with the asphalt compositions of the present invention used on the surface are minimized and/or eliminated. Also as a result, stresses and forces are absorbed rather than transferred by the pavements made with the asphalt compositions of the present invention used on an interlayer. The present invention provides asphalt compositions which effectively channel water. As a result, the dangers associated with hydroplaning and skidding on pavements made with the asphalt compositions of the present invention are minimized and/or eliminated.

In one embodiment, the present invention relates to an asphalt composition for paving surfaces to accommodate motorized vehicles containing from about 5% to about 97% by weight asphalt; from about 1% to about 50% by weight of a terpenoid liquid; from about 1% to about 50% by weight of a rubber polymer; and from about 1% to about 98% by weight of a flexible aggregate, wherein a resultant asphalt pavement made with the asphalt composition which is at least ¼ inch in thickness flexes at least about ¹/₁₀₀₀ of an inch by a force greater than about 22 lbs/in².

In another embodiment, the present invention relates to a method of paving a surface to accommodate motorized vehicles comprising providing a mixture comprising: asphalt; a terpenoid liquid; a rubber polymer at least partially soluble in the mixture; and flexible aggregate; and applying the mixture to a surface, wherein a resultant asphalt pavement made with the mixture which is at least ¼ inch in thickness is flexes at least about ¹/₁₀₀₀ of an inch by a force greater than about 22 lbs/in².

In yet another embodiment, the present invention relates to a method of paving a surface involving the steps of providing a mixture containing asphalt; a terpenoid liquid; and a rubber solid at least partially soluble in the mixture; applying the mixture to a surface; applying flexible aggregate to the mixture covered surface to form a stress absorbing layer; applying an asphalt composition comprising asphalt and hard aggregate to the stress absorbing layer.

In still yet another embodiment, the present invention relates to a method of paving a surface involving the steps of providing a mixture containing asphalt, a terpenoid liquid, a rubber solid and flexible aggregate; applying the mixture to a surface to form a stress absorbing layer; applying an asphalt composition comprising asphalt and hard aggregate to the stress absorbing layer.

DETAILED DESCRIPTION OF THE INVENTION

The asphalt compositions according to the present invention contain at least three components, preferably contain at least four components, and more preferably contain at least five components. The five components of the asphalt compositions include asphalt, a terpenoid liquid, a rubber polymer, flexible aggregate and at least one of a surfactant and a paraffin. According to the present invention, the use of hard aggregate in asphalt paving is not required. The asphalt compositions may be used for paving surfaces, typically to make roads and parking lots to accommodate motorized vehicles, and paths to accommodate light vehicles and pedestrians.

The asphalt compositions of the present invention contain asphalt. Asphalt generally includes bituminous substances derived from petroleum, shale oil, coal tar, pitches and the like. Asphalt as bitumous substances are typically mixtures of hydrocarbons of natural and/or pyrogenous origin, frequently accompanied by their non-metallic derivatives. Asphalt is a cementitious material having a solid or semisolid consistency in which the dominating constituents are bituminous which occur in nature as such or are obtained as residua in petroleum refining.

In one embodiment, asphalt is a mixture of paraffinic and aromatic hydrocarbons and heterocyclic compounds containing sulfur, nitrogen and oxygen. Asphalt includes petroleum asphalts, natural asphalts, Gilsonite, air-blown asphalts and other similar type materials. Asphalt may be prepared by vacuum distillation of a topped crude oil. In one embodiment, asphalt has penetration at 25° C. ranging from about 20 to about 300 dmm (as measured by ASTM D5). In a preferred embodiment, asphalt has penetration at 25° C. ranging from about 50 to about 250 dmm, and more preferably from about 75 to about 200 dmm. Asphalts are commercially available. Examples of asphalts include AC-40, AC-20, AC-10, AC-5 and AC-2.5, and distillation bottoms such as those manufactured by Safety Klean Corp.

In another embodiment, asphalt includes tars and their derivatives, such as coal tars reduced to float grades (RT grades), coal tar pitches, residua from pyrogenous distillates (water-gas, wood, peat, bone, shale, rosin, and fatty acid tars).

In one embodiment, the asphalt composition contains from about 5% to about 97% by weight asphalt. In another embodiment, the asphalt composition contains from about 20% to about 90% by weight asphalt. In a preferred embodiment, the asphalt composition contains from about 30% to about 75% by weight asphalt.

The asphalt compositions of the present invention contain a terpenoid liquid. Terpenoid liquids occur in many plants, and thus many may be considered natural products. In one embodiment, the terpenoid liquid is a citrous product (derived from plants bearing citrous fruits).

Terpenoids are generally derivatives of isoprene (a $C_5$ unit). Terpenoids include terpenes and compounds of terpene origin that do not have carbon skeletons composed exclusively of isoprene units. Compounds of terpene origin that do not have carbon skeletons composed exclusively of isoprene units are termed terpene derivatives. Terpenoids include cyclic terpenoids (open chain) and cyclic terpenoids such as monocyclic terpenoids, bicyclic terpenoids, tricyclic terpenoids, etc. Terpenoids may include a racemic mixture of enantiomeric terpenoids or a substantially pure optically active isomer of a terpenoid.

In one embodiment, the terpenoid is a terpene (having a carbon skeleton composed exclusively of isoprene units). In another embodiment, the terpenoid is a terpene derivative that does not have a carbon skeleton composed exclusively of isoprene units. Terpene derivatives typically have a terpene skeleton which is altered through at least one of rearrangements, degradative loss of carbon atoms, oxygenated derivatives, hydrogenated derivatives and possessing additional carbon atoms of nonterpene origin. Terpenes include hemiterpenes, monoterpenes, sesquiterpenes, diterpenes, sesterterpenes, and triterenes. Terpene derivatives include the saturated and partially saturated isomers of terpenes, derivatives of terpenes, in addition to the alcohols, aldehydes, esters of terpenes, etc.

Specific examples of terpenoids include tricyclene, α-pinene, α-fenchene, camphine, β-pinene, myrcene, cis-pinane, cis-p-menthane, 1,4-cineole, 1,8-cineole, liminonene, p-cynene, fenchone, α-terpinene, β-terpinene, γ-terpenene, linalool, coridandrol, α-fenchol, citronellal, camphor, trans-β-terpineol, trans-menthone, terpinen-4-ol, neomenthol, borneol, isoborneol, menthol, citronellol, nerol, geraniol, carvon, hydroxycitronellal, terpin, α-ionone, β-inonone, 3-carene, alloocimene, myrcenol, geraniol, farnesol, geranylgaraniol, squalene, the substantially pure D or L optical isomers thereof, positional isomers thereof, derivatives and other isomers thereof, and combinations of two or more thereof. By way of example, optical isomers include D-limonene and L-limonene; linalool and coridandrol (the L and D-isomers of 3,7-dimethyl-1,6-octadiene-3-ol, respectively), and the o-m- and p- positional isomers of cymene (isopropyl toluene) include o-cymene, m-cymene and p-cymene.

Terpenoid liquids may be obtained from plants, plant extracts, by synthetically manipulating plants or plant extracts, and/or by synthetical techniques known to those skilled in the art. Terpenoid liquids are commercially available. The so-called acetylene-acetone synthetic route can be used to synthesize monoterpenes. Synthetic manipulations include steps such as hydrogenation, oxidation, reduction, alkylation, dealkylation, rearrangements and other procedures commonly used in synthetic organic chemistry.

In one embodiment, the asphalt composition contains from about 1% to about 50% by weight of a terpenoid liquid. In another embodiment, the asphalt composition contains from about 5% to about 40% by weight of a terpenoid liquid. In a preferred embodiment, the asphalt composition contains from about 10% to about 30% by weight of a terpenoid liquid.

The asphalt compositions of the present invention contain a rubber polymer. Rubber polymers include any natural or synthetic high polymers having the properties of deformation (elongation and/or yield under stress) and elastic recovery. The rubber polymer may be capable of at least partially dissolving in the asphalt composition containing the terpenoid liquid at ambient temperatures. In a preferred embodiment, the rubber polymer is capable of at least substantially dissolving in the asphalt composition containing the terpenoid liquid at ambient temperatures. In a most preferred embodiment, the rubber polymer is capable of entirely dissolving in the asphalt composition containing the terpenoid liquid at ambient temperatures.

Synthetic rubbers generally include elastomers. Elastomers include polysulfide, polychloroprene (neoprene), butadiene styrene copolymers, acrylonitrile butadiene copolymers (nitrile rubber), ethylene propylene diene rubbers, synthetic polyisoprene, butyl rubber (copolymer of isobutylene and isoprene), polyacrylonitrile and combinations thereof. These elastomers may further include conjugated diene monomers and/or copolymerizable comonomers selected from vinyl monomers, vinyl aromatic monomers, unsaturated nitrile monomers, acrylate monomers, alkylacrylate monomers and olefin monomers.

In one embodiment, rubber polymers include graft copolymers, hydrogenated rubber polymers, linear block copolymers and radial block copolymers. In one embodiment, the rubber polymer contains two rubber polymers, and in another embodiment, the rubber polymer contains three rubber polymers.

In one embodiment, the rubber polymer is a hydrogenated diene-vinyl arene copolymer which can be prepared by hydrogenating a copolymer of a conjugated diene, such as 1,3-butadiene, isoprene, 2,3-dimethyl-1,3-butadiene and the like, and a vinyl arene, such as styrene, α-methylstyrene, o-,m-, and p-vinyl-toluene and the like. Preferred hydrogenated diene-vinyl arene copolymers include isoprene-styrene or butadiene-styrene random or block copolymers. Hydrogenated butadiene-styrene copolymers are commercially available from Shell under the trademark Kraton®, such as Kraton® D and G grades thermoplastic rubbers. Preferably, the butadiene:styrene weight ratios of the hydrogenated butadiene-styrene copolymers range from about 50:50 to about 90:10.

Elastomers also include triblock copolymers (A-B-A) having styrene or polystyrene as the "A" block or end block units. In one embodiment, the rubber polymer includes a triblock copolymer elastomer such as styrene butadiene styrene block copolymers, a styrene isoprene styrene block copolymer and a styrene ethylene butylene styrene block copolymer.

In a preferred embodiment, the rubber polymer is a styrene butadiene copolymer. Styrene butadiene copolymers are available from Firestone as Stereon 840 Polymer and Stereon 210 Polymer. Generally speaking, rubber polymers are commercially available from a number of sources, for example, from Firestone, Fina, Shell, Dow and A. Schulman.

In another embodiment, the rubber polymer is a latex. A latex is a tacky, aqueous suspension of a hydrocarbon polymer occurring naturally on certain plants, or made synthetically. Thus, the latex may be natural or synthetic. Synthetic latex may be made by emulsion polymerization techniques from styrene-butadiene copolymer, acrylate resins, polyvinyl acetate and similar materials.

In one embodiment, the asphalt composition contains from about 1% to about 50% by weight of a rubber polymer. In another embodiment, the asphalt composition contains from about 5% to about 40% by weight of a rubber polymer. In a preferred embodiment, the asphalt composition contains from about 10% to about 30% by weight of a rubber polymer.

The asphalt compositions of the present invention contain flexible aggregate. Flexible aggregate is not hard material, but instead a soft or rubbery material. In other words, flexible aggregate is bendable or compressible due the application of external force while being able to substantially or wholly resume its shape exhibited prior to the application of external force after the external force is no longer applied. Flexible aggregate include particulates of rubber which do not substantially dissolve in the asphalt composition so that the flexible aggregate is set into place and mechanical bonding between the flexible aggregate and the rest of the asphalt composition is facilitated.

The flexible aggregate is flexible unlike hard aggregate such as sand, pebbles or rock. In a most preferred embodiment, the asphalt composition of the present invention does not contain inflexible or hard aggregate such as sand, pebbles or rock, although inflexible aggregate may be optionally added to the asphalt composition of the present invention in some instances. In another embodiment, the asphalt composition of the present invention contains less than about 10% by weight, preferably less than about 5% by weight, and more preferably less than about 1% by weight hard aggregate.

Flexible aggregate generally includes virgin rubber, reclaimed tire rubber, ground tire rubber (with and without carcass fabric residue), rubber tire buffings from tire plants and retreading shops, ground inner-tubes, and scrap rubber crumbs. In a preferred embodiment, the flexible aggregate is reclaimed ground tire chips or particles.

The size and shape of the flexible aggregate is not critical to the invention. The shape of the flexible aggregate is generally polymorphous or randomly shaped particles and/ or chips. In one embodiment, the size of the particles or chips (average cross-section) of the flexible aggregate range from about 1 $\mu$m to about 30 mm. In another embodiment, the size of the particles of the flexible aggregate range from about 0.01 mm to about 25 mm. In a preferred embodiment, the size of the particles of the flexible aggregate range from about 1 mm to about 15 mm.

In a preferred embodiment, the flexible aggregate is vulcanized rubber preferably obtained as recycled tire material (commonly referred to as reclaimed tire chippings). Tires are generally made of a composite containing various rubbers; processing aids that act as plasticizers or softeners; accelerators including xanthates such as dibutyl xanthogen disulfide; crosslinking materials such as sulfur; fillers such as carbon black; and metal cords such as steel wire coated with brass.

The rubber that originates from a scrap or used tire may be processed prior to use in the asphalt compositions of the present invention. The rubber can be subjected to further processing to remove hydrofillic and hydrophobic contaminants in the recycled tire material or introduced during a grinding process. Solvents such as water, carbon tetrachloride, and other commonly used industrial solvents used in combination thereof can be used to wash the tire rubber material. The recycled tire material is typically shredded or ground.

In one embodiment, the asphalt composition contains from about 1% to about 98% by weight of a flexible aggregate. In another embodiment, the asphalt composition contains from about 5% to about 85% by weight of a flexible aggregate. In a preferred embodiment, the asphalt composition contains from about 10% to about 80% by weight of a flexible aggregate.

In one embodiment, the asphalt composition, aside from the asphalt component and optionally the terpenoid liquid, does or need not contain substantial amounts of organic solvents such as kerosene, benzene, naphtha, chlorododecane, carbon tetrachloride, chlorotoluene, toluene, xylenes, diesel oil, diisopropyl benzene, heavy gasoline, hexane, and octadecane. These organic solvents are undesirable because of toxicity concerns and possible detrimental effects on the environment. In one embodiment, the asphalt compositions of the present invention do not contain more than 5% by weight of added organic solvents (in addition to that which may be present in the asphalt). In a preferred embodiment, the asphalt compositions of the present invention do not contain more than 2% by weight of added organic solvents. In a most preferred embodiment, the asphalt compositions of the present invention do not contain added organic solvents. In this connection, the asphalt compositions of the present invention are environmentally friendly.

One or more optional additives may be added to the asphalt compositions of the present invention. Optional ingredients include additional aggregate, vulcanized rubber, fiber reinforcement, oil, glass, surfactants, paraffins, and other common additives. Particularly useful additives include oils derived from plants, which are biodegradable, and specifically modified vegetable oils, such as modified soybean oil (methyl esters of soybean oil) available under the trade designation Soygold (Soygold 1000 and 2000) from A. G. Environmental Products, other bean derived oils, conola oil, corn oil, sunflower oil, etc, which may or may not be modified. Another specific example of an additive is available under the trade designation SBO from Young Chemical Company of Brookpark, Ohio.

Preferred surfactants include nonionic surfactants. Surfactants contribute to the ability of the asphalt compositions of the present invention to set quickly. Nonionic surfactants include ethoxylated alcohols and ethoxylated alkyl phenols. Ethoxylated alcohols and ethoxylated alkyl phenols are available under the trade designations Tergitol® from Union Carbide and Igepal from Rhone-Poulenc. In one embodiment, the asphalt compositions of the present invention contain from about 1% to about 30% by weight of a surfactant. In another embodiment, the asphalt compositions of the present invention contain from about 2% to about 20% by weight of a surfactant.

The asphalt compositions of the present invention optionally contain paraffins or waxes. Paraffins and waxes decrease the apparent tackiness of the asphalt compositions of the present invention. In one embodiment, the asphalt compositions of the present invention contain from about 0.1% to about 10% by weight of a paraffin and/or wax. In another embodiment, the asphalt compositions of the present invention contain from about 1% to about 5% by weight of a paraffin and/or wax.

In operation, the asphalt, the rubber polymer and the terpenoid liquid are combined and optionally heated to form a mixture. The mixture is optionally heated to a temperature sufficient to substantially dissolve the rubber polymer and to permit spraying of the mixture on a surface. However, heating is not necessary. In one embodiment, the mixture is heated to a temperature of at least 275° F. In another embodiment, the mixture is heated to a temperature of at least 325° F. In yet another embodiment, the mixture is heated to a temperature of at least 375° F.

In one embodiment, the mixture contains from about 5% to about 99% by weight asphalt, from about 1% to about 80% by weight of a terpenoid liquid and from about 1% to about 80% by weight of a rubber polymer. In another embodiment, the mixture contains from about 20% to about 95% by weight asphalt, from about 5% to about 60% by weight of a terpenoid liquid and from about 5% to about 50% by weight of a rubber polymer.

The mixture is applied to a surface followed by application of the flexible aggregate to the mixture covered surface. In one embodiment, the amount of mixture applied to the surface is from about 0.1 gallons to about 4 gallons of mixture (asphalt, the terpenoid liquid and rubber polymer) per square yard of surface. In a preferred embodiment, the amount of mixture applied to the surface is from about 0.2 gallons to about 2 gallons of mixture per square yard of surface. The flexible aggregate is applied so that it is distributed substantially uniformly over the surface, covering at least about 10% of the surface, preferably at least about 20% of the surface, more preferably at least about 40% of the surface, and most preferably at least about 50% of the surface.

In one embodiment, it is not necessary to roll the flexible aggregate into place since the weight of the flexible aggregate is sufficient enough to embed the flexible aggregate in the mixture applied to the surface so long as the flexible aggregate is applied soon after the mixture is applied to the surface (within about 2 minutes, preferably within about 1 minute). In another embodiment, the flexible aggregate is rolled into place after application to the mixture coated surface. Upon cooling, the viscosity of the mixture applied to the surface rapidly increases whereby the flexible aggregate is set into place to form a pavement where the flexible aggregate is not dislodged by subsequent traffic or snowplow use.

In another embodiment, asphalt, the rubber polymer and optionally the terpenoid liquid are combined, mixed, and optionally heated to a temperature sufficient to substantially dissolve the rubber polymer to form a mixture. The flexible aggregate is then added to the mixture and the asphalt composition is immediately applied to a surface. In this embodiment, it is not necessary roll the asphalt composition as the flexible aggregate is sufficiently embedded in the composition. In one embodiment, the amount of the asphalt composition applied to the surface is from about 0.1 gallons to about 4 gallons per square yard of surface. In another embodiment, the amount of the asphalt composition applied to a surface is from about 0.2 gallons to about 2 gallons per square yard of surface.

In one embodiment, the rubber polymer and the terpenoid liquid are initially combined prior to combining the rubber polymer and the terpenoid liquid with the asphalt. If necessary, the mixture of the rubber polymer and terpenoid liquid can be heated and mixed to promote dissolution of the rubber polymer in the mixture. In another embodiment, all of the components of the asphalt composition are combined, mixed, and then applied to a surface.

The resultant asphalt pavement with the asphalt composition of the present invention is characterized by its flexibility and elastomeric type properties in addition to durability (strong yet flexible). This is in contrast to conventional asphalt pavements which are characterized by sturdiness and resistance to deformation and/or flexibility. Water that contacts the asphalt pavement surface goes into the porous air spaces created by the presence of the exposed flexible aggregate. As a result, the tendency of hydroplaning is reduced. Skid resistance for vehicles is increased due to the increased friction between the surface of the asphalt pavement and tires of a vehicle due to the presence of the exposed flexible aggregate in the asphalt composition. In freezing weather, when ice is present on the surface of the asphalt pavement made with the asphalt composition according to the present invention, vehicle tires in contact with the pavement exert external force that flexes the surface of the asphalt pavement. This action releases the bond and cracks and lifts off ice from the surface of the pavement (not unlike the action involved in freezing and releasing ice cubes from a plastic ice cube tray).

In this connection, it is critical that the resultant asphalt pavement with the asphalt composition of the present invention possess certain deformation characteristics (flexible under tire pressure). In one embodiment, a resultant asphalt pavement which is at least ¼ inch in thickness flexes (or is deformed) at least about ¹⁄₁₀₀₀ of an inch by a force greater than about 22 lbs/in$^2$ (typically from about 22 lbs/in$^2$ to about 36 lbs/in$^2$). Flexing refers to the change in thickness and shape of the resultant asphalt pavement underneath a vehicle tire due to the force of the weight of the vehicle (normal thickness versus vehicle compressed thickness). In another embodiment, a resultant asphalt pavement which is at least ¼ inch in thickness flexes at least about ¹⁄₁₀₀ of an inch by a force greater than about 24 lbs/in$^2$ (typically from about 24 lbs/in$^2$ to about 36 lbs/in$^2$). In yet another embodiment, a resultant asphalt pavement which is at least ¼ inch in thickness flexes at least about ¹⁄₅₀ of an inch by a force greater than about 24 lbs/in$^2$ (typically from about 24 lbs/in$^2$ to about 36 lbs/in$^2$). In still yet another embodiment, a resultant asphalt pavement which is at least ¼ inch in thickness flexes at least about ¹⁄₃₂ of an inch by a force greater than about 24 lbs/in$^2$ (typically from about 24 lbs/in$^2$ to about 36 lbs/in$^2$). In another embodiment, a resultant asphalt pavement which is at least ¼ inch in thickness flexes at least about ¹⁄₁₆ of an inch by a force greater than about 24 lbs/in$^2$ (typically from about 24 lbs/in$^2$ to about 36 lbs/in$^2$).

In another embodiment, the asphalt composition is applied to a surface using one of the methods described above, and then a conventional asphalt layer is provided over the asphalt composition according to the present invention. In this embodiment, the asphalt layer according to the present invention may or may not be over an old, cracked asphalt pavement which is in need of resurfacing. The asphalt composition according to the present invention acts as a stress absorbing layer in this embodiment.

A stress absorbing layer according to the present invention absorbs movement (forces) from the underlying surface and thus does not transfer the movement (forces) to the overlying surface, and vice versa. As a result of reducing the transfer of force from one layer to another, stresses associated with cracks present in an old underlying pavement, which is resurfaced with a stress absorbing layer according to the present invention and a conventional asphalt layer, do not induce crack formation in the convention asphalt layer.

While the invention has been explained in relation to its preferred embodiments, it is to be understood that various modifications thereof will become apparent to those skilled in the art upon reading this specification. Therefore, it is to be understood that the invention disclosed herein is intended to cover such modifications as falling within the scope of the appended claims.

What is claimed is:

1. A method of paving a surface to accommodate motorized vehicles comprising:
    providing a mixture comprising:
        asphalt;
        a terpenoid liquid;
        a rubber polymer at least partially soluble in the mixture; and
        flexible aggregate; and
    applying the mixture to a surface, wherein a resultant asphalt pavement made with the mixture which is at least ¼ inch in thickness is flexes at least about $1/1000$ of an inch by a force greater than about 22 lbs/in$^2$.

2. The method of claim 1, wherein the mixture comprises the terpenoid liquid and the terpenoid liquid comprises a terpene.

3. The method of claim 1, wherein the mixture comprises the terpenoid liquid and the terpenoid liquid comprises limonene.

4. The method of claim 1, wherein the rubber polymer comprises a styrene-butadiene copolymer or a latex.

5. The method of claim 1, wherein the flexible aggregate comprises reclaimed tire chippings.

6. The method of claim 1, wherein the mixture comprises from about 20% to about 99% by weight asphalt, from about 1% to about 80% by weight of the terpenoid liquid and from about 1% to about 80% by weight of the rubber polymer.

7. The method of claim 1, wherein the flexible aggregate covers at least about 10% of the mixture covered surface.

8. A method of paving a surface comprising:
    providing a mixture comprising:
        asphalt;
        a terpenoid liquid; and
        a rubber solid at least partially soluble in the mixture;
    applying the mixture to a surface;
    applying flexible aggregate to the mixture covered surface to form a stress absorbing layer;
    applying an asphalt composition comprising asphalt and hard aggregate to the stress absorbing layer.

9. The method of claim 8, wherein the mixture comprises from about 5% to about 99% by weight asphalt, from about 1% to about 80% by weight of the terpenoid liquid and from about 1% to about 80% by weight of the rubber polymer.

10. The method of claim 8, wherein the flexible aggregate covers at least about 10% of the mixture covered surface.

11. The method of claim 8, wherein mixture comprises the terpenoid liquid and the terpenoid liquid comprises limonene.

12. The method of claim 8, wherein the rubber polymer comprises a latex and the flexible aggregate comprises reclaimed tire chippings.

* * * * *